United States Patent
Chen et al.

(10) Patent No.: US 12,506,579 B2
(45) Date of Patent: Dec. 23, 2025

(54) DATA TRANSFER DURING MOBILITY IN LAYER 2 RELAY

(71) Applicant: Apple Inc., Cupertino, CA (US)

(72) Inventors: Yuqin Chen, Beijing (CN); Dawei Zhang, Saratoga, CA (US); Fangli Xu, Beijing (CN); Haijing Hu, Los Gatos, CA (US); Longda Xing, San Jose, CA (US); Murtaza A. Shikari, Mountain View, CA (US); Sethuraman Gurumoorthy, San Ramon, CA (US); Sree Ram Kodali, San Jose, CA (US); Srinivasan Nimmala, San Jose, CA (US); Srirang A. Lovlekar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 18/006,772

(22) PCT Filed: Aug. 5, 2020

(86) PCT No.: PCT/CN2020/107223
§ 371 (c)(1),
(2) Date: Jan. 25, 2023

(87) PCT Pub. No.: WO2022/027374
PCT Pub. Date: Feb. 10, 2022

(65) Prior Publication Data
US 2023/0269053 A1      Aug. 24, 2023

(51) Int. Cl.
*H04L 5/00* (2006.01)
*H04W 36/00* (2009.01)
*H04W 88/04* (2009.01)

(52) U.S. Cl.
CPC ......... *H04L 5/0053* (2013.01); *H04W 36/033* (2023.05); *H04W 88/04* (2013.01)

(58) Field of Classification Search
None
See application file for complete search history.

(56) References Cited

U.S. PATENT DOCUMENTS

| | | | |
|---|---|---|---|
| 2008/0070614 A1* | 3/2008 | Ogushi | H04W 52/0216 455/522 |
| 2008/0125037 A1* | 5/2008 | Ibrahim | H04W 4/18 455/41.2 |

(Continued)

FOREIGN PATENT DOCUMENTS

| | | |
|---|---|---|
| CN | 102300335 | 12/2011 |
| CN | 107690165 | 2/2018 |

(Continued)

OTHER PUBLICATIONS

MediaTek Inc. et al., "FS_5G_ProSe: Discussion on Relay Security", SA WG2 Meeting #139E , S2-2004053, May 22, 2020, 3 sheets.

(Continued)

*Primary Examiner* — Eunsook Choi
(74) *Attorney, Agent, or Firm* — Fay Kaplun & Marcin, LLP

(57) ABSTRACT

A user equipment (UE) is configured to operate as a relay UE between a remote UE and a base station. The relay UE receives, from an originating device, a data packet for relay to a recipient device, determines that the relay of the data packet to the recipient device has failed and sends, to the originating device, a transmission including the data packet, wherein the transmission comprises an indication that the data packet is being returned to the originating device.

19 Claims, 15 Drawing Sheets

(56) References Cited

U.S. PATENT DOCUMENTS

| | | | | |
|---|---|---|---|---|
| 2011/0285516 | A1* | 11/2011 | Ritter | H04W 88/04 |
| | | | | 370/276 |
| 2012/0113887 | A1 | 5/2012 | Shen et al. | |
| 2012/0207100 | A1* | 8/2012 | Hakola | H04W 76/14 |
| | | | | 370/328 |
| 2014/0286251 | A1* | 9/2014 | Kohli | H04W 56/00 |
| | | | | 370/329 |
| 2018/0077650 | A1* | 3/2018 | Nakahara | H04W 56/0015 |
| 2019/0037639 | A1 | 1/2019 | Nolan et al. | |
| 2019/0141771 | A1 | 5/2019 | Ma et al. | |
| 2020/0374772 | A1* | 11/2020 | Zhang | H04W 36/008355 |
| 2021/0377834 | A1* | 12/2021 | Luo | H04W 76/23 |

FOREIGN PATENT DOCUMENTS

| | | |
|---|---|---|
| WO | 2010/148356 | 12/2010 |
| WO | 2011/053490 | 5/2011 |

OTHER PUBLICATIONS

China Potevio Co., Ltd, "An approach of coordinate communication based on relay overhearing in LTE-advanced system", 3GPP TSG-RAN WG1 #55b, R1-090016, Jan. 7, 2009, 12 sheets.

* cited by examiner

DATA TRANSFER DURING MOBILITY IN LAYER 2 RELAY

BACKGROUND

A user equipment (UE) may be configured with multiple communication links. For example, the UE may receive a signal from a cell of a network over a downlink and may transmit a signal to the cell over an uplink. The UE may also be configured to communicate with a further UE via a sidelink. The term sidelink refers to a communication link that may be utilized for device-to-device (D2D) communication. The sidelink may be used as a radio relay link. For example, to facilitate communication between the network and the remote UE in a UE-to-Network relay, the network may exchange signals with the relay UE via an uplink/downlink and the relay UE may exchange signals with the remote UE via a sidelink.

The remote UE may be a mobile device that moves into and out of coverage of network cells. Thus, in some instances, the remote UE may communicate with network cells via the relay UE while, in other instances, the remote UE may communicate directly with the network cells. When the remote UE changes from a relay connection to a direct connection, there may be data that has already been sent to the relay UE that is intended for the remote UE or the network cell. The relay UE may no longer have the connection to forward the data to the recipient device. This results in dropped data transmissions and a bad user experience.

SUMMARY

Some exemplary embodiments are related to a user equipment (UE) configured to operate as a relay UE between a remote UE and a base station. The UE has one or more processors and a transceiver communicatively connected to the one or more processors. The one or more processors configured to perform operations. The operations include receiving, from an originating device, a data packet for relay to a recipient device, determining that the relay of the data packet to the recipient device has failed and sending, to the originating device, a transmission including the data packet, wherein the transmission comprises an indication that the data packet is being returned to the originating device.

Other exemplary embodiments are related to a baseband processor configured to perform operations. The operations include receiving, from an originating device, a data packet for relay to a recipient device, determining that the relay of the data packet to the recipient device has failed and sending, to the originating device, a transmission including the data packet. The transmission includes an indication that the data packet is being returned to the originating device, and an original Radio Link Control (RLC) Protocol Data Unit (PDU) received from the originating device that included the data packet.

DETAILED DESCRIPTION

Figure 1:
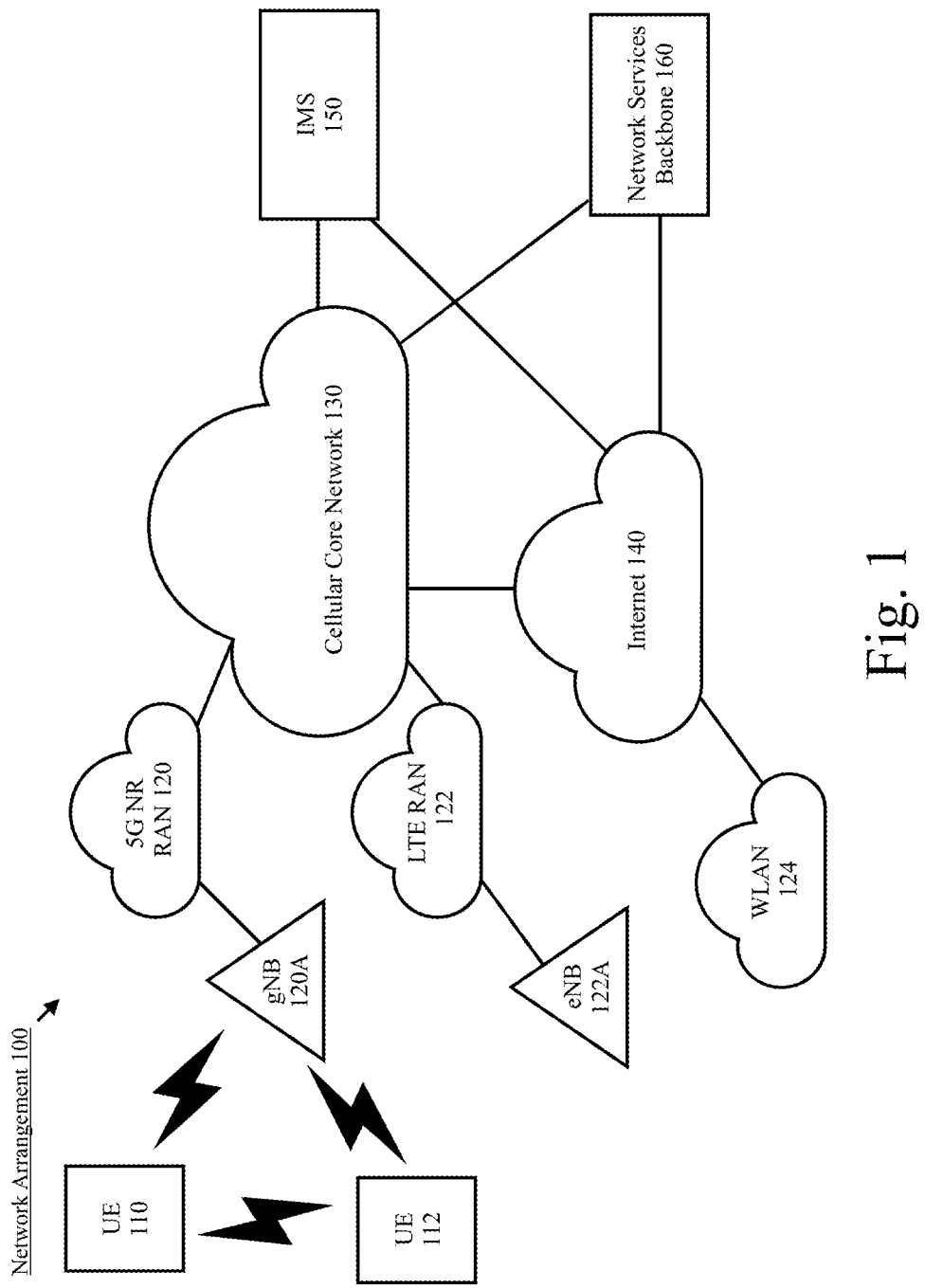
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments provide mechanisms for a relay UE to return data packets to an originating device and the originating device to resend the data packets to the intended recipient.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with reference to UE-to-Network relay scenario. In a UE-to-Network relay scenario, there may be a remote UE, a relay UE and a cell. The term "remote UE" may refer to a UE that is configured as a remote end of a relay. The term "relay UE" may refer to a UE that is configured to serve as a relay point between two remote endpoints of the relay. In this example, the other remote endpoint is the cell. To facilitate communication between the remote UE and the network in a UE-to-Network relay, the cell may exchange signals with the relay UE via an uplink and/or downlink Uu connection and the relay UE may exchange signals with the remote UE via a sidelink connection. Thus, the remote UE may access network services via the relay UE.

As stated above, the remote UE may move into a network cell coverage area where the remote may be able to establish a direct connection with the cell, e.g., the remote UE may establish a Uu connection with the cell. To maintain consistency throughout this description, the remote UE will continue to be referred to as a remote UE even when it established the direct Uu connection to the cell. It should also be understood that the remoted UE may establish the Uu connection with the network for other reasons unrelated to moving into a cell coverage area. Thus, the exemplary embodiments are not limited to any particular mobility scenario but may be applied to any situation where a remote UE changes from a relay connection to a direct connection to a network.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc. An actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
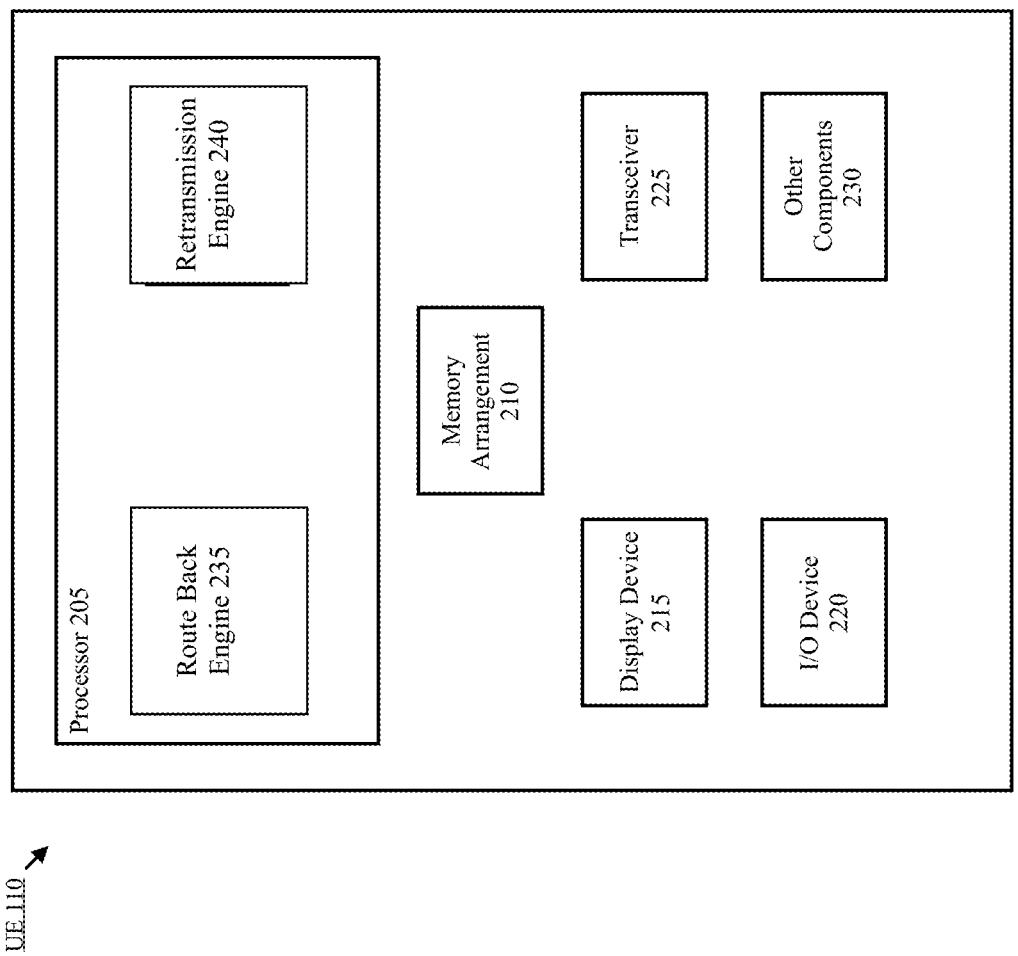
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 235 may include, for example, an audio input device, an audio output device, a power supply, a data acquisition device, ports to electrically connect the UE 110 to other electronic devices, etc. The UE 110 illustrated in FIG. 2 may also represent the UE 112. The UE 110 described with respect to FIG. 2 may act as either a remote UE or a relay UE.

The processor 205 may be configured to execute a plurality of engines of the UE 110. For example, the engines may include a route back engine 235 and a retransmission engine 240. The route back engine 235 may perform operations related to routing UL or DL data packets back to the devices that originated the data packets when the UE 110 is acting in the capacity of a relay UE. The retransmission engine 240 may perform operations related to receiving UL data packets that the UE 110 originated and retransmitting the UL data packets on a different link. Examples of the operations related to the route back engine 235 and the retransmission engine 240 will be described in greater detail below.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the UE 112, the 5G NR-RAN 120, the LTE-RAN 122, WLAN 122, etc. Accordingly, the transceiver 225 may operate on a variety of different frequencies or channels (e.g., set of consecutive frequencies).

Figure 3:
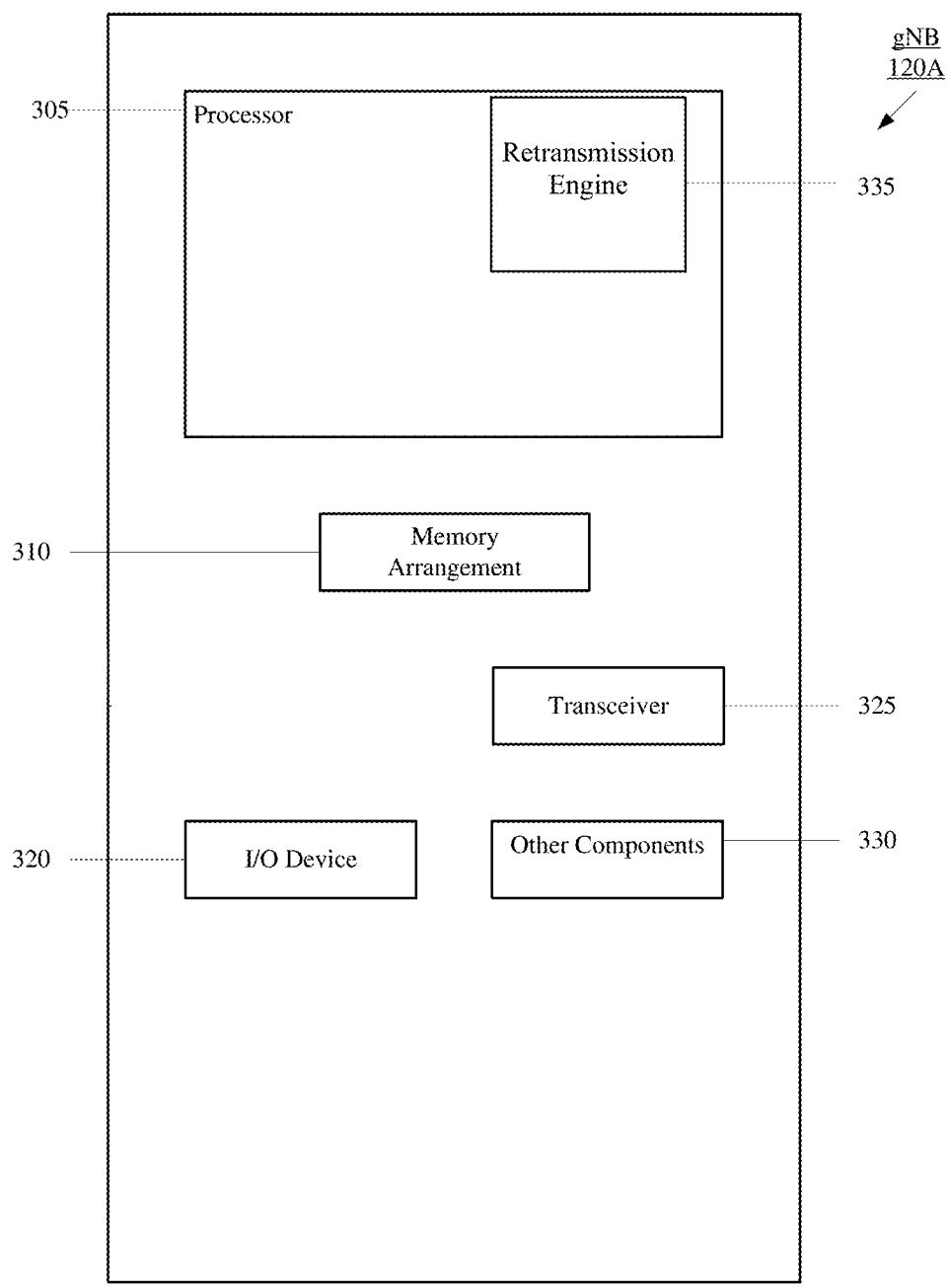
FIG. 3 shows an exemplary base station according to various exemplary embodiments

FIG. 3 shows an exemplary network cell, in this case gNB 120A, according to various exemplary embodiments. The gNB 120A may represent any access node of the 5G NR network through which the UEs 110 may establish a connection.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a retransmission engine 335 for performing operations related to receiving DL data packets that the gNB 120A originated and retransmitting the DL data packets on a different link. Examples of the receiving and retransmitting operations will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
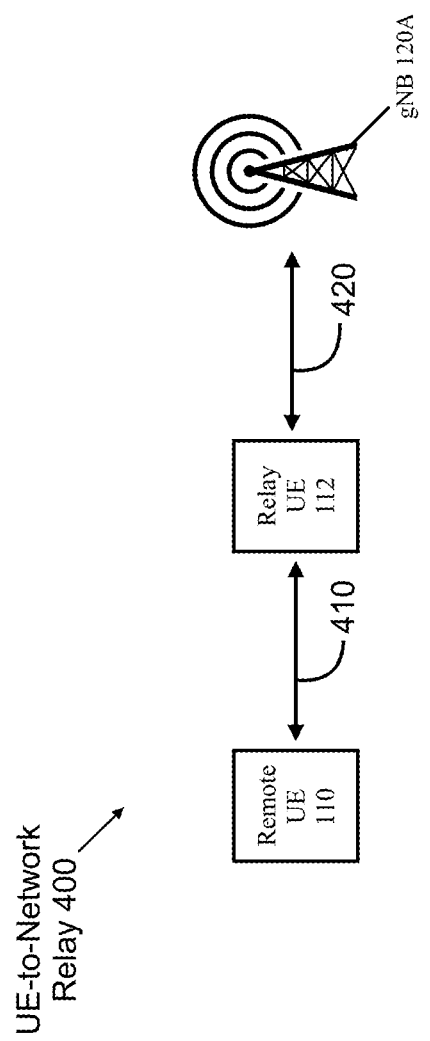
FIG. 4 shows an example of a UE-to-Network relay according to various exemplary embodiments.

FIG. 4 shows an example of a UE-to-Network relay 400 according to various exemplary embodiments. FIG. 3 will be described with regard to the network arrangement 100 of FIG. 1 and the UE 110 of FIG. 2.

The UE-to-network relay 400 includes the remote UE 110, the relay UE 112 and the gNB 120A of the 5G NR RAN 120. The remote UE 110 may exchange signals with the relay UE 112 via the sidelink 410. In this example, the sidelink 410 may represent a PC5 interface. However, the exemplary embodiments are not limited to the PC5 interface and any appropriate communication interface may be used between the remote UE 110 and the relay UE 112. The relay UE 112 may exchange signals with the 5G NR RAN 120 via the gNB 120A. In this example, the connection 420 between the relay UE 112 and the 5G NR RAN 120 may represent a Uu interface. However, the exemplary embodiments are not limited to the Uu interface and any appropriate communication interface may be used between the relay UE 112 and the 5G NR RAN 120.

The remote UE 110 may access network services from the 5G NR RAN 120 via the UE-to-Network relay 400. For example, the remote UE 110 may transmit information and/or data intended for the 5G NR RAN 120 to the relay UE 112 via the sidelink 410. The relay UE 112 may then transmit the information and/or data intended for the 5G NR RAN 120 to the 5G NR RAN 120 via the connection 420. Similarly, the 5G NR RAN 120 may transmit information and/or data intended for the remote UE 110 to the relay UE 112 via the connection 420. The relay UE 112 may then transmit the information and/or data intended for the remote UE 110 to the remote UE 110 via the sidelink 410. Thus, the remote UE 110 may be accessible and controllable by the gNB 120A via the UE-to-Network relay 400.

Figure 5A:
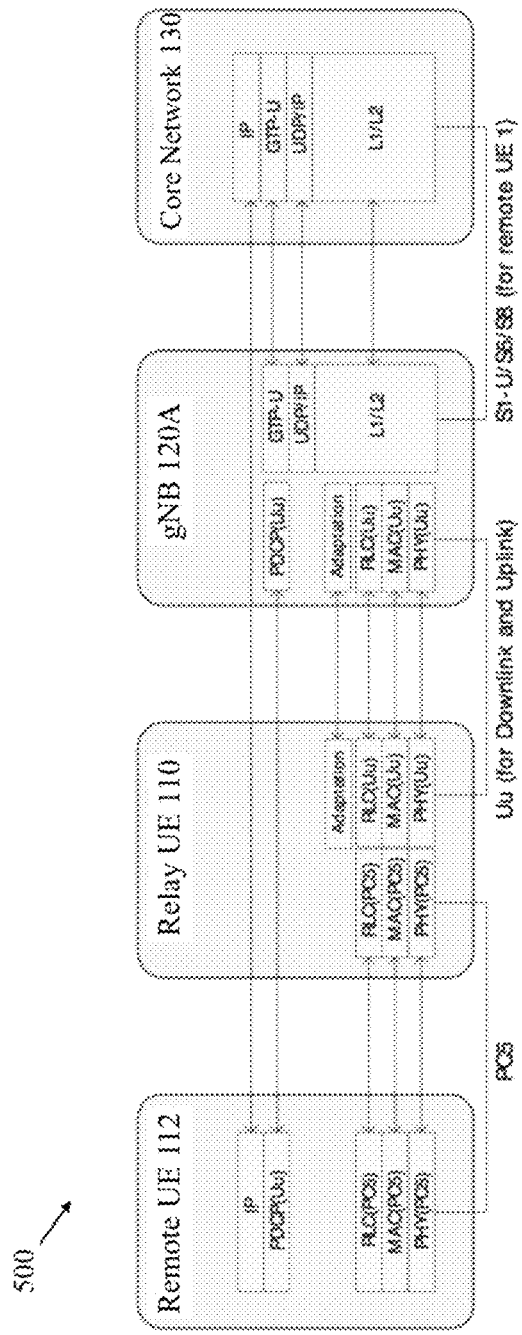
FIG. 5A shows an example of a UE-to-Network relay user plane protocol stack signaling according to various exemplary embodiments.
Figure 5B:
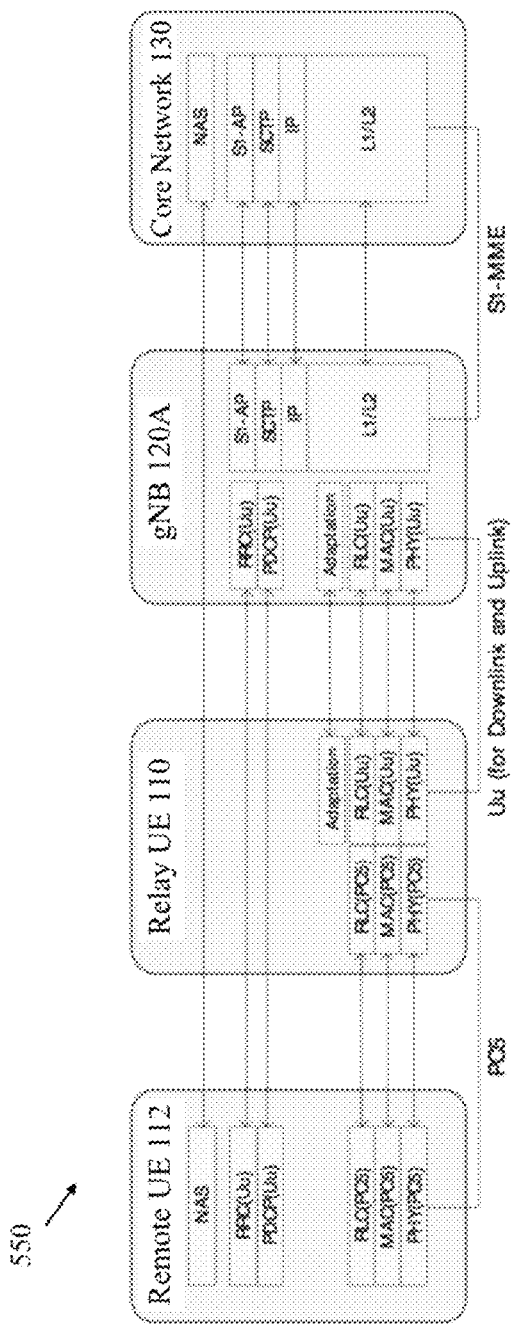
FIG. 5B shows an example of a UE-to-Network relay control plane protocol stack signaling according to various exemplary embodiments.

FIG. 5A shows an example of a UE-to-Network relay 500 user plane protocol stack signaling according to various exemplary embodiments. FIG. 5B shows an example of a UE-to-Network relay 550 control plane protocol stack signaling according to various exemplary embodiments. As can be seen from FIGS. 5A and 5B, for protocol architecture for the user plane and the control plane, relaying is performed above the Radio Link Control (RLC) sublayer. In these examples, the Uu Packet Data Convergence Protocol (PDCP) layer and Radio Resource Control (RRC) layer are terminated between the remote UE 112 and the gNB 120A. In contrast, the Radio Link Control (RLC), Medium Access Control (MAC) and Physical (PHY) layers and the non-3GPP transport layers are terminated in each link.

Downlink (DL) Transmissions

Figure 6:
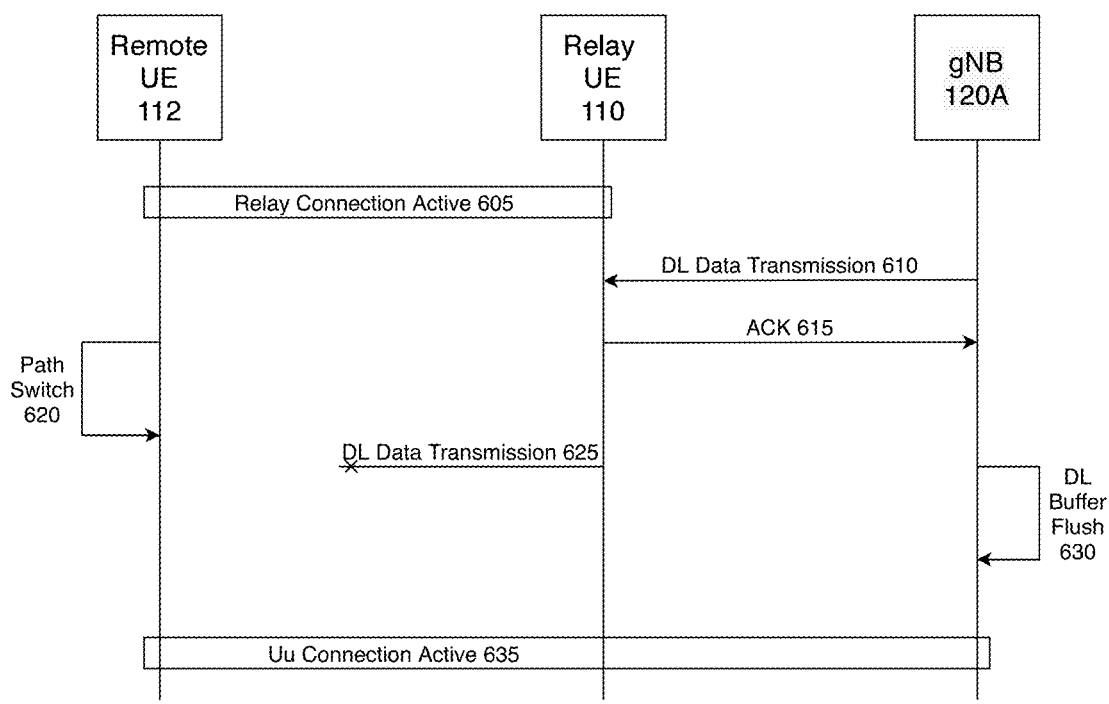
FIG. 6 shows an exemplary signaling diagram for a downlink (DL) data exchange between a gNB and a remote UE.

FIG. 6 shows an exemplary signaling diagram 600 for a downlink (DL) data exchange between a gNB 120A and a remote UE 112. The signaling diagram 600 is described with regard to the network arrangement 100 of FIG. 1 and the UE-to-Network relay of FIG. 4. In 605, it may be considered that the UE-to-Network relay is configured and active. For example, in the DL direction, the gNB 120A may send data packets intended for the remote UE 112 to the relay UE 110, which the relay UE 110 may then forward to the remote UE 112. The signaling diagram 600 will be described from the standpoint of a single DL data packet, but it should be understood that more than one DL data packet may experience the signaling of signaling diagram 600.

In 610, the gNB 120A has a data packet for the remote UE 112. In accordance with the UE-to-Network relay scheme, the gNB 120A transmits the data packet to the relay UE 110. In 615, the relay UE 110 sends an acknowledgement (ACK) to the gNB 120A indicating that the data packet has been successfully received. In 625, the relay UE 110 forwards the data packet to the remote UE 112. However, in this example, the DL data transmission in 625 from the relay UE 110 to the remote UE 112 fails. The reason for the failure is that in 620, the remote UE 112 executed a path switch. The path switch in 620 means that the remote UE 112 has switched from the UE-to-Network relay scheme to a direct Uu connection with the gNB 120A. Thus, the sidelink connection (e.g., PC5 connection) between the remote UE 112 and the relay UE 110 is no longer active and the DL data transmission in 625 fails.

In the meantime, in 630, it is shown that the gNB 120A has flushed the DL buffer. Those skilled in the art will understand that the gNB 120A may have a portion of memory that is a DL buffer. The DL buffer will hold the DL data packets until the gNB 120A has been informed that the DL data packets have been successfully received by the receiving device or, in some cases, for a predetermined amount of time. After the successful receipt or the predetermined amount of time, the data packets are flushed from the DL buffer. In this example, the gNB 120A received the ACK 615 from the relay UE 110 for the exemplary DL data packet. The UE-to-Network relay scheme is a hop-by-hop relay, thus, the gNB 120A believes that the DL data packet has been successfully received by the receiving device and the data packet may be flushed from the DL buffer.

In 635, it may be considered that the Uu connection between the remote UE 1123 and the gNB 120A is configured and active, e.g., as a result of the path switch operation 620. However, at this point, it should be understood that the remote UE 112 has not received the DL data packet, the relay UE 110 has the DL data packet and the gNB 120A has flushed the DL data packet from the DL buffer because it incorrectly believes the DL data packet has reached the intended recipient. In this scenario, the DL data packet is stranded at the relay UE 110 with no manner of reaching the intended recipient remote UE 112. The exemplary embodiments provide manners of routing the stranded DL data packet to the intended recipient remote UE 112.

Figure 7:
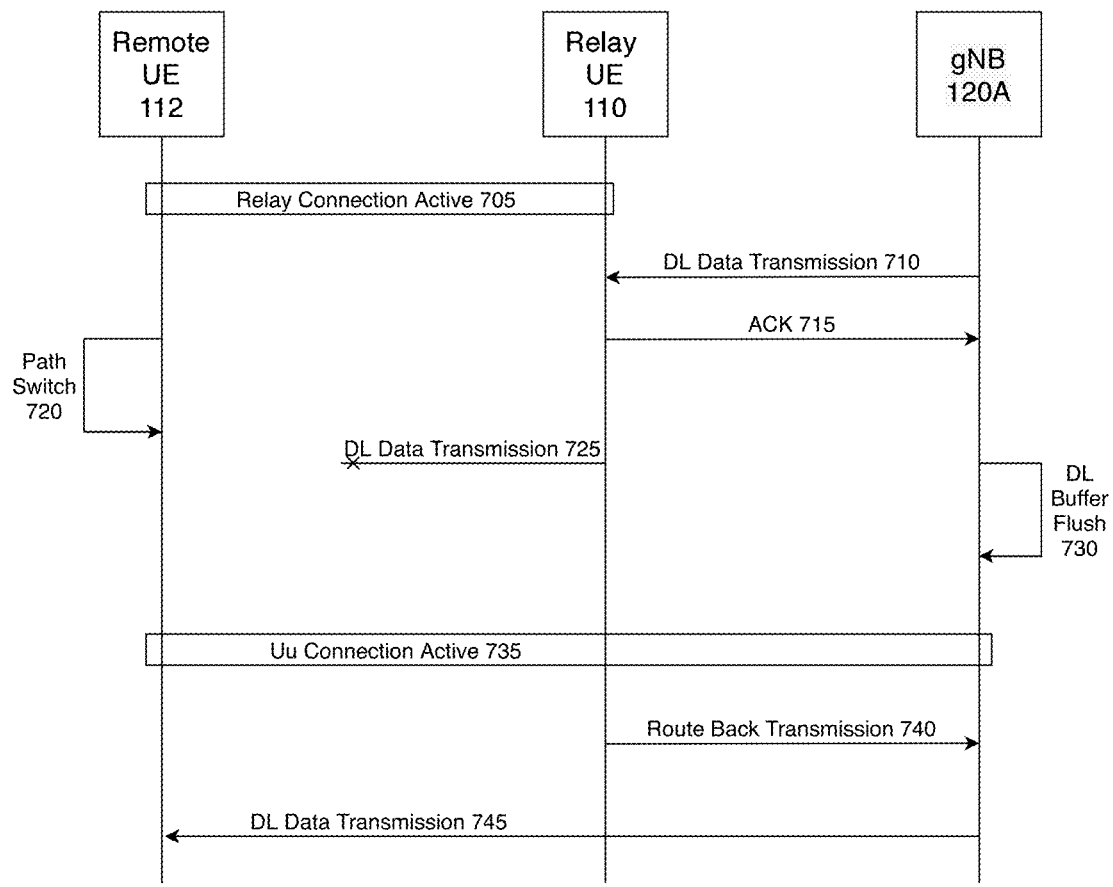
FIG. 7 shows an exemplary signaling diagram for a downlink (DL) data exchange between a gNB and a remote UE according to various exemplary embodiments.

FIG. 7 shows an exemplary signaling diagram 700 for a downlink (DL) data exchange between a gNB 120A and a remote UE 112 according to various exemplary embodiments. The signaling diagram 600 is described with regard to the network arrangement 100 of FIG. 1 and the UE-to-Network relay of FIG. 4. As will be described in greater detail below, in some exemplary embodiments a new MAC sub-header may be introduced to identify DL packets that are routed back to the gNB 120A because the relay UE 110 could not successfully forward the data packets to the remote UE 112 because of the path switch by the remote UE 112. In other exemplary embodiments a modified UL adaptation may be introduced to identify DL packets that are routed back to the gNB 120A.

The signaling 705-735 of signaling diagram 700 may be similar to the signaling 605-635 of signaling diagram 600. Thus, this signaling will not be described again. As described above, at 735, the remote UE 112 has not received the DL data packet, the relay UE 110 has the DL data packet and the gNB 120A has flushed the DL data packet from the DL buffer because it incorrectly believes the DL data packet has reached the intended recipient.

In some exemplary embodiments, the relay UE 112 may perform a route back transmission 740 to send the data packet back to the gNB 120A. The relay UE 110 may return the data packet to the gNB 120A. However, since the route back transmission 740 is a return of previously transmitted DL data to the gNB 120A and not a normal UL data transmission as the gNB 120A would expect from the relay UE 110, the relay UE 110 may identify the route back transmission 740 as such a return of DL data to the gNB 120A.

Figure 8:
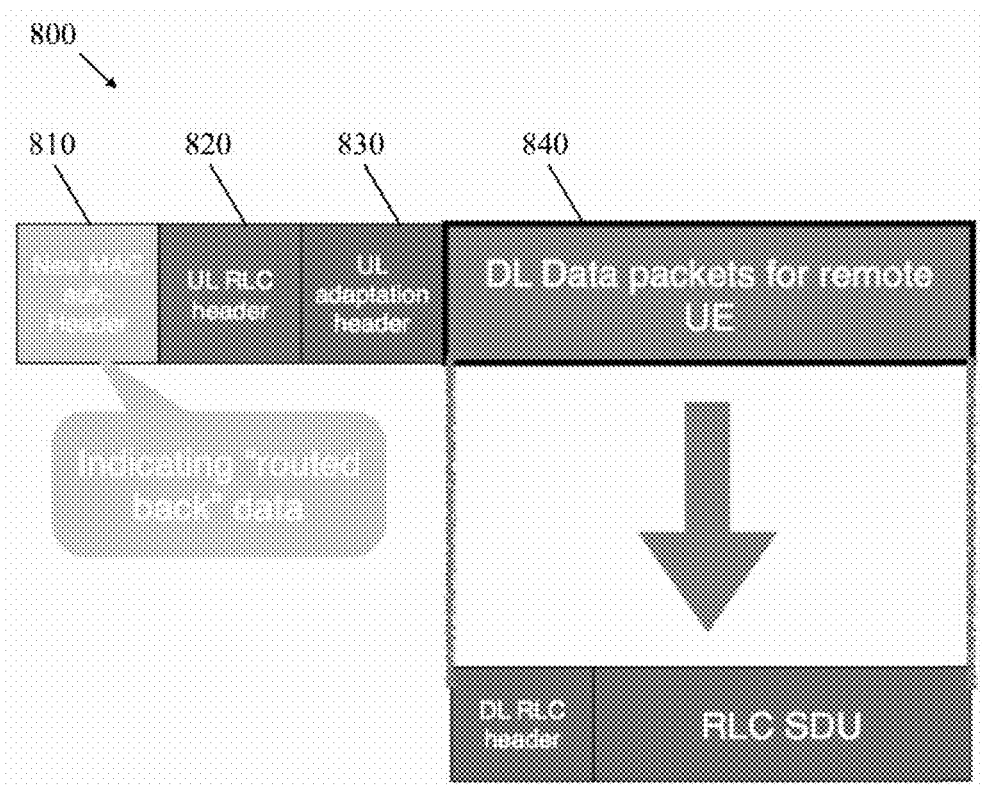
FIG. 8 shows an exemplary data encapsulation that includes a new UL MAC sub-header indicating the data payload is routed back DL data according to various exemplary embodiments.

In some exemplary embodiments, the route back transmission 740 may include a new UL MAC sub-header that indicates the data payload (e.g., data packet) is routed back data. FIG. 8 shows an exemplary data encapsulation 800 that includes a new UL MAC sub-header 810 indicating the data payload is routed back DL data according to various exemplary embodiments. The data encapsulation 800 includes the new UL MAC sub-header 810, a UL RLC header 820, a UL adaptation header 830 and the DL data packets 840 originally intended for the remote UE 112. The new UL MAC sub-header will be described in greater detail below with reference to FIGS. 9A and 9B. The UL RLC header 820 and the UL adaptation header 830 may be considered to be the normal headers associated with UL data transmissions. The data payload 840 may be the original DL RLC Protocol Data Unit (PDU), to allow the gNB 120A to differentiate the original data radio bearers (DRBs).

Figure 9A:
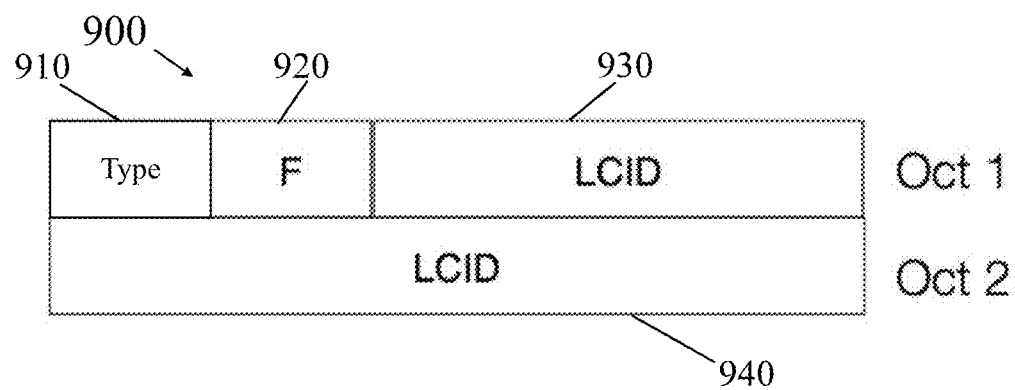
FIG. 9A shows a first exemplary new UL MAC sub-header that indicates the data payload is routed back DL data according to various exemplary embodiments.

FIG. 9A shows a first exemplary new UL MAC sub-header 900 that indicates the data payload is routed back DL data according to various exemplary embodiments. The new UL MAC sub-header 900 includes a Type field 910, a Format (F) field 920 and a Logical Channel Identification (LCID) field 930 in a first octet and an LCID field 940 in a second octet. In this exemplary embodiment, the Type field 910 may include the indication that the data payload is routed back DL data. For example, the Type field 910 may be a one-bit field that is set to "1" when the data payload is routed back DL data.

Returning to the signaling diagram 700 of FIG. 7, the route back transmission 740 may be encapsulated as shown in the exemplary data encapsulation 800 of FIG. 8 to include the new UL MAC sub-header (e.g., the new MAC sub-header 900) that includes the indication of whether the data payload is routed back DL data. When the gNB 120A receives and decodes the route back transmission 740, the gNB 120A will understand that the data payload is routed back DL data.

In 745, the gNB 120A may then send a DL data transmission to the remote UE 112, via the Uu connection, that includes the data packet(s) that were returned to the gNB 120A by the relay UE 110. The gNB 120A may decipher and re-cipher the data packet before sending out the routed back DL data to remote UE 112 over the Uu interface because the data is being sent via a different connection, the original ciphering may not be valid.

In some exemplary embodiments, a timer may be introduced for the relay UE 110. The timer may start when the relay link between the relay UE 110 and the remote UE 112 is terminated. The relay UE 110 may route back the data packets that were intended for the remote UE 112 to the gNB 120A until the timer expires. When the timer expires, any remaining data packets may be discarded by the relay UE 110. The data packets may be discarded because, when the timer expires, the data in the data packets is likely stale and there is no reason to route back stale data to the gNB 120A.

The data packets that are routed back to the gNB 120A may be associated with Quality of Service (QoS) handling. Thus, when the data packet is routed back to the gNB 120A in the route back transmission 740, the data packet should be retransmitted to the remote UE 112 (e.g., DL data transmission 745) using the same QoS requirements. However, it may not be feasible to configure the DRB(s) per service requirements since the relay UE 110 cannot understand the traffic pattern of DL data for the remote UE 112.

In some exemplary embodiments, the route back transmission 740 may use the default DRB to carry the routed back data. In other exemplary embodiments, the route back transmission 740 may use the reflective UL DRB(s) to carry the routed back data. Those skilled in the art will understand that in a reflective QoS DRB scheme, one or more DL DRBs may correspond to one or more UL DRBs wherein the corresponding DRBs are referred to as reflective DRBs. These corresponding or reflective DRBs may be associated with the same QoS requirements. Thus, when routing back data, the relay UE 110 may understand the DL DRB used for the original transmission of the data (e.g., the DL data transmission 710) and use a reflective DRB for the route back transmission 740. In this manner, when the gNB 120A receives the route back transmission 740 on the reflective DRB, the gNB 120A implicitly understands the QoS requirements for the data that has been returned.

In other exemplary embodiments, the route back transmission 740 may include a new UL MAC sub-header that is encapsulated in the same manner as shown in FIG. 8. However, in these exemplary embodiments, the new UL MAC sub-header may be formatted in a different manner to indicate the data payload is routed back DL data.

Figure 9B:
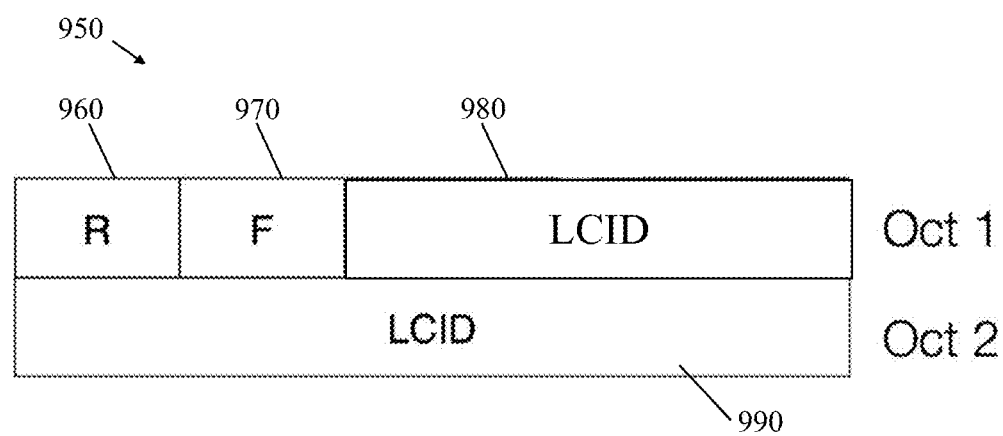
FIG. 9B shows a second exemplary new UL MAC sub-header that indicates the data payload is routed back DL data according to various exemplary embodiments.

FIG. 9B shows a second exemplary new UL MAC sub-header 850 that indicates the data payload is routed back DL data according to various exemplary embodiments. The new UL MAC sub-header 950 includes a Reserved (R) field 960, a Format (F) field 970 and a LCID field 980 in a first octet and an LCID field 990 in a second octet. In this exemplary embodiment, the LCID field 980 may include a pre-defined logical channel to function similar to a tunnel to route back the DL data.

Again returning to the signaling diagram 700 of FIG. 7, the route back transmission 740 may be encapsulated as shown in the exemplary data encapsulation 800 of FIG. 8 to include the new UL MAC sub-header (e.g., the new MAC sub-header 950) that includes the indication of whether the data payload is routed back DL data (e.g., the identification of the pre-defined logical channel in the LCID field 980). When the gNB 120A receives and decodes the route back transmission 740, the gNB 120A will understand that the data payload is routed back DL data based on the pre-defined logical channel in the new MAC sub-header 950. In these exemplary embodiments, the QoS handling may be based on a pre-defined DRB being used to carry the routing back data. The gNB 120A may then send a DL data transmission 745 to the remote UE 112, via the Uu connection, that includes the data packet(s) that were returned to the gNB 120A by the relay UE 110.

In still other exemplary embodiments, the route back transmission 740 may use a UL adaptation header that includes an indication that the data payload is routed back DL data. In these exemplary embodiments, it may not be necessary to introduce the new MAC sub-headers as were described above. This may allow the legacy headers to remain as is without any alteration.

Figure 10:
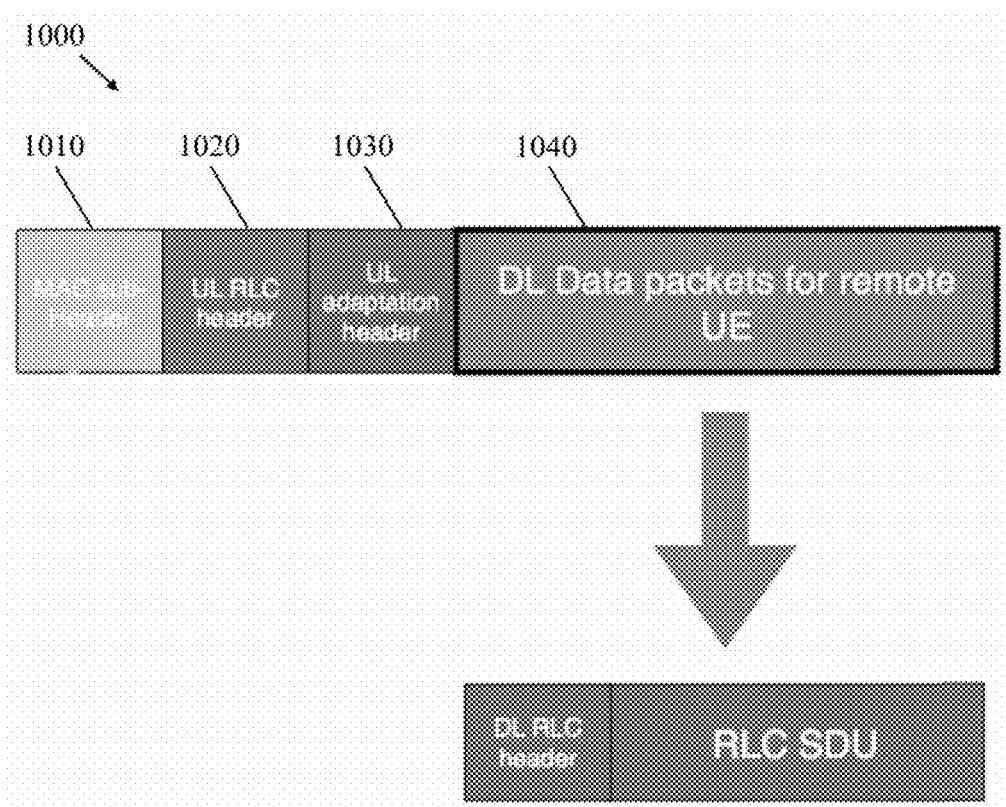
FIG. 10 shows an exemplary data encapsulation that includes a UL adaptation header indicating the data payload is routed back DL data according to various exemplary embodiments.

FIG. 10 shows an exemplary data encapsulation 1000 that includes a UL adaptation header 1030 indicating the data payload is routed back DL data according to various exemplary embodiments. The data encapsulation 1000 includes the MAC sub-header 1010, a UL RLC header 1020, a UL adaptation header 1030 and the DL data packets 940 originally intended for the remote UE 112. The MAC sub-header 1010 and the UL RLC header 1020 may be considered to be the normal headers associated with UL data transmissions. As those skilled in the art will understand, the adaptation layer is a concept that is still being determined for 3GPP communications. In this exemplary embodiment, it is proposed that the UL adaptation header 1030 will include an identification that the route back transmission 740 includes routed back DL data identify the remote UE 112 and/or the relay UE 110 and the corresponding bearer. In this manner, the gNB 120A will understand the route back transmission 740 is routed back DL data.

Again returning to the signaling diagram 700 of FIG. 7, the route back transmission 740 may be encapsulated as shown in the exemplary data encapsulation 1000 of FIG. 10 to include the UL adaptation header 1030 that includes the indication of whether the data payload is routed back DL data. When the gNB 120A receives and decodes the route back transmission 740, the gNB 120A will understand that the data payload is routed back DL data based on the UL adaptation header 1030. The gNB 120A may then send a DL data transmission 745 to the remote UE 112, via the Uu connection, that includes the data packet(s) that were returned to the gNB 120A by the relay UE 110.

In these exemplary embodiments, the QoS handling may be similar to the QoS handling described above, e.g., the route back transmission 740 may be sent via a default DRB or a reflective DRB.

Uplink (UL) Transmissions

Figure 11:
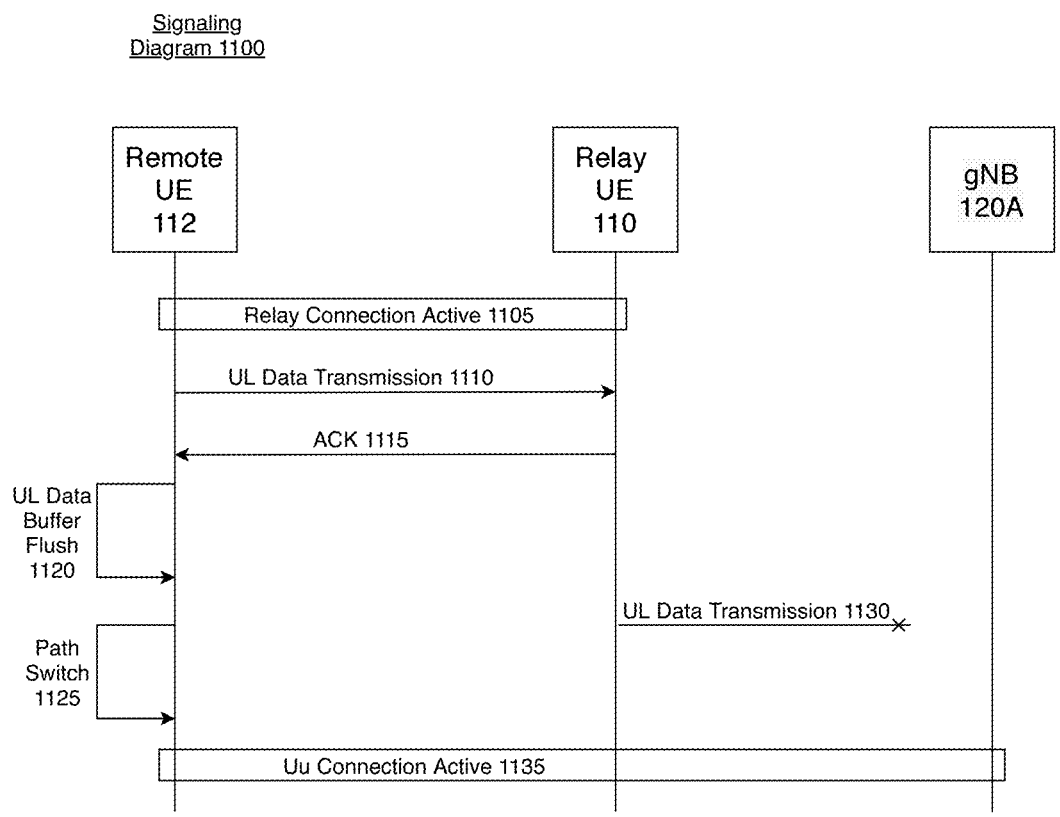
FIG. 11 shows an exemplary signaling diagram for an uplink (UL) data exchange between a gNB and a remote UE.

FIG. 11 shows an exemplary signaling diagram 1100 for a uplink (UL) data exchange between a gNB 120A and a remote UE 112. The signaling diagram 1100 is described with regard to the network arrangement 100 of FIG. 1 and the UE-to-Network relay 400 of FIG. 4. In 1005, it may be considered that the UE-to-Network relay 400 is configured and active. For example, in the uplink (UL), the remote UE 112 may send data packets intended for the gNB 120A to the relay UE 110, which then forwards the data to the gNB 120A. The signaling diagram 1100 will be described from the standpoint of a single UL data packet, but it should be understood that more than one UL data packet may experience the signaling of signaling diagram 1100.

In 1110, the remote UE 112 has a data packet for the gNB 120A. In accordance with the UE-to-Network relay scheme, the remote UE 112 transmits the data packet to the relay UE 110. In 1115, the relay UE 110 sends an acknowledgement (ACK) to the remote UE 112 indicating that the data packet has been successfully received. In 1120, the remote UE 112 flushes the UL buffer. In 1125, the remote UE 112 executes a path switch from the UE-to-Network relay scheme to a direct Uu connection with the gNB 120A. In 1130, the relay UE 110 forwards the data packet to the gNB 120A. However, in this example, the UL data transmission 1130 from the relay UE 110 to the gNB 120A fails because the relay connection is no longer active. Thus, similar to the issue described above with respect to the DL, in this scenario, the UL data packet is stranded at the relay UE 110 with no manner of reaching the intended recipient gNB 120A. The exemplary embodiments provide manners of routing the stranded UL data packet to the intended recipient gNB 120A.

Figure 12:
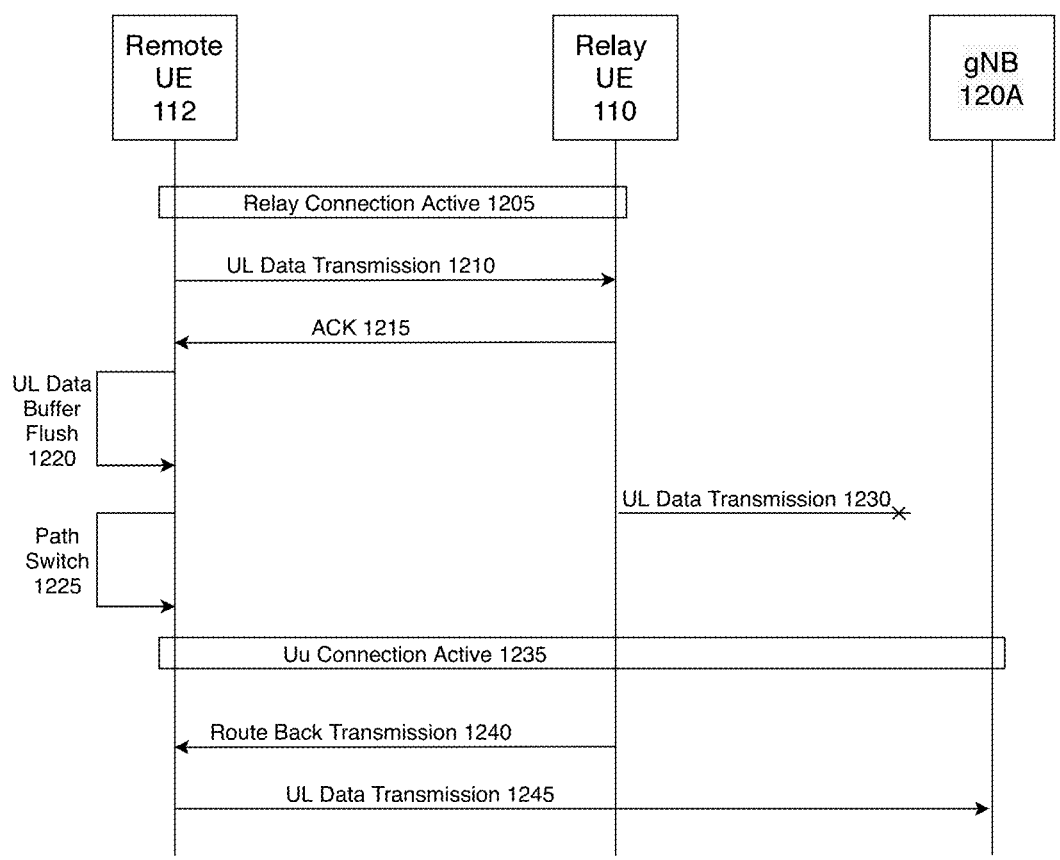
FIG. 12 shows an exemplary signaling diagram for an uplink (UL) data exchange between a gNB and a remote UE according to various exemplary embodiments.

FIG. 12 shows an exemplary signaling diagram 1200 for a uplink (UL) data exchange between a gNB 120A and a remote UE 112 according to various exemplary embodiments. The signaling diagram 1120 is described with regard to the network arrangement 100 of FIG. 1 and the UE-to-Network relay 400 of FIG. 4. As will be described in greater detail below, in some exemplary embodiments a new DL MAC sub-header may be introduced to identify UL packets that are routed back to the remote UE 112 because the relay UE 110 could not successfully forward the data packets to the gNB 120A because of a Uu link failure between the relay UE 110 and the gNB 120A. The Uu link failure may be related to the path switch by the remote UE 112 or any other reason that prevents the relay UE 110 from forwarding the UL packet to the gNB 120A.

The signaling 1205-1235 of signaling diagram 1200 may be similar to the signaling 1105-1135 of signaling diagram 1100. Thus, this signaling will not be described again. As described above, at 1235, the gNB 120A has not received the UL data packet, the relay UE 110 has the UL data packet and the remote UE 112 has flushed the UL data packet from the UL buffer because it incorrectly believes the UL data packet has reached the intended recipient.

In some exemplary embodiments, the relay UE 112 may perform a route back transmission 1240 to send the data packet back to the remote UE 112. The relay UE 110 may return the data packet to the remote UE 112. However, since the route back transmission 1240 is a return of previously transmitted UL data to the remote UE 112 and not a normal DL data transmission as the remote UE 112 would expect from the relay UE 110, the relay UE 110 may identify the route back transmission 1140 as such a return of UL data to the remote UE 112.

Figure 13:
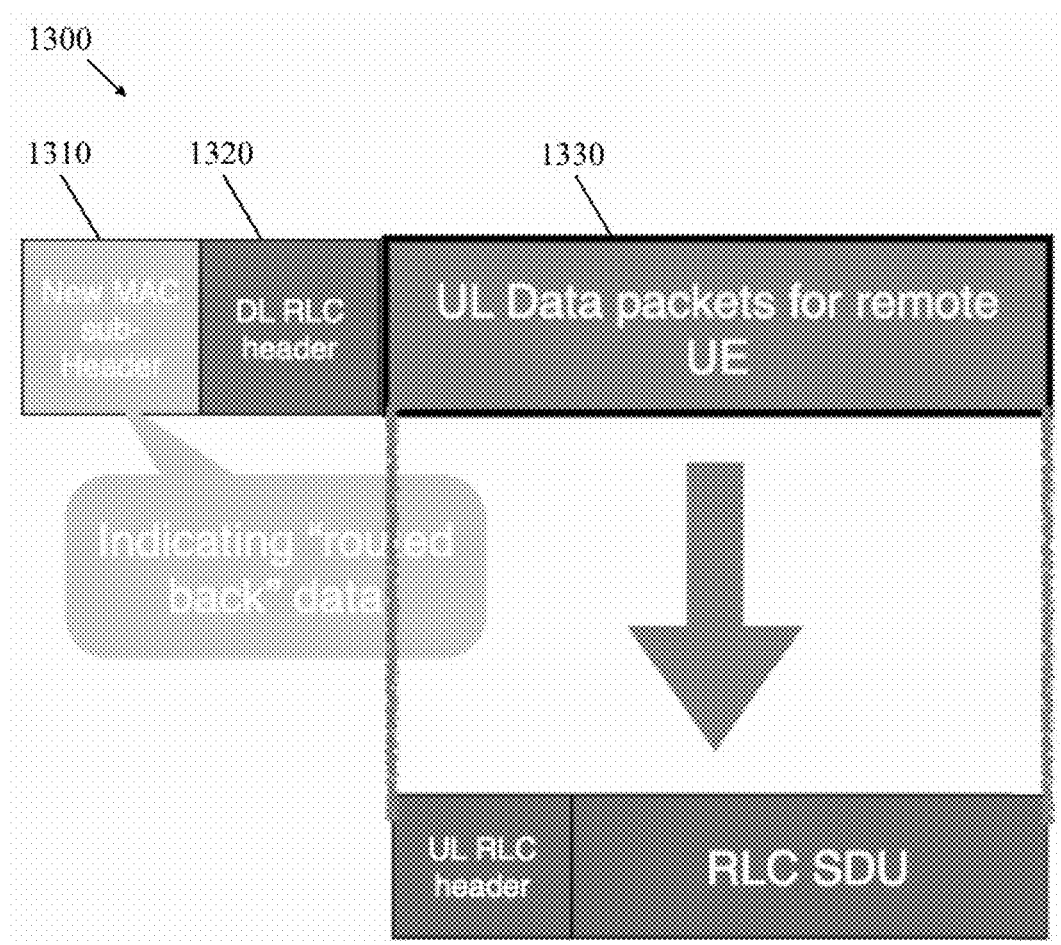
FIG. 13 shows an exemplary data encapsulation that includes a new DL MAC sub-header indicating the data payload is routed back UL data according to various exemplary embodiments.

In some exemplary embodiments, the route back transmission 1240 may include a new DL MAC sub-header that indicates the data payload (e.g., data packet) is routed back data. FIG. 13 shows an exemplary data encapsulation 1300 that includes a new DL MAC sub-header 1310 indicating the data payload is routed back UL data according to various exemplary embodiments. The data encapsulation 1300 includes the new DL MAC sub-header 1310, a DL RLC header 1320, and the UL data packets 1330 originally intended for the gNB 120A. The new DL MAC sub-header 1310 will be described in greater detail below with reference to FIGS. 14A and 14B. The DL RLC header 1320 may be considered to be the normal header associated with DL data transmissions. The data payload 1330 may be the original UL RLC PDU to allow the remote UE 112 to differentiate the original DRBs.

Figure 14A:
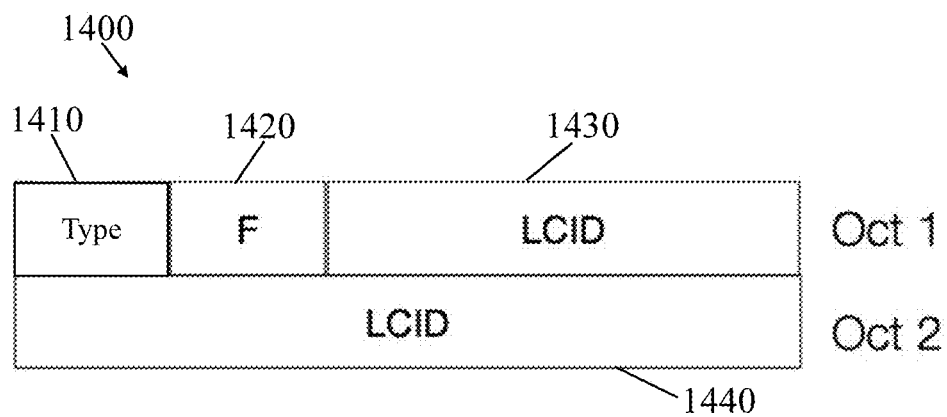
FIG. 14A shows a first exemplary new DL MAC sub-header that indicates the data payload is routed back DL data according to various exemplary embodiments.

FIG. 14A shows a first exemplary new DL MAC sub-header 1400 that indicates the data payload is routed back UL data according to various exemplary embodiments. The new DL MAC sub-header 1400 includes a Type field 1410, a Format (F) field 1420 and an LCID field 1430 in a first octet and an LCID field 1440 in a second octet. In this exemplary embodiment, the Type field 1410 may include the indication that the data payload is routed back UL data. For example, the Type field 1410 may be a one-bit field that is set to "1" when the data payload is routed back UL data.

Returning to the signaling diagram 1200 of FIG. 12, the route back transmission 1240 may be encapsulated as shown in the exemplary data encapsulation 1300 of FIG. 13 to include the new DL MAC sub-header (e.g., the new DL MAC sub-header 1400) that includes the indication of whether the data payload is routed back UL data. When the remote UE 112 receives and decodes the route back transmission 1240, the remote UE 112 will understand that the data payload is routed back UL data.

In 1245, the remote UE 112 may then send a UL data transmission to the gNB 120A, via the Uu connection, that includes the data packet(s) that were returned to the remote UE 112 by the relay UE 110. The remote UE 112 may decipher and re-cipher the data packet before sending out the routed back UL data to the gNB 120A over the Uu interface because the data is being sent via a different connection, the original ciphering may not be valid.

In some exemplary embodiments, a timer may be introduced for the relay UE 110. The timer may start when the relay link between the relay UE 110 and the remote UE 112 is terminated. The relay UE 110 may route back the data packets that were intended for the gNB 120A to the remote UE 112 until the timer expires. When the timer expires, any remaining data packets may be discarded by the relay UE 110. The data packets may be discarded because, when the timer expires, the data in the data packets is likely stale and there is no reason to route back stale data to the remote UE 112.

The data packets that are routed back to the gNB 120A may be associated with Quality of Service (QoS) handling. It may not be feasible to configure the DRB(s) per service requirements since the relay UE 110 cannot understand the traffic pattern of UL data for the remote UE 112. In some exemplary embodiments, the route back transmission 1240 may use the default sidelink (SL) DRB to carry the routed back data.

In other exemplary embodiments, the route back transmission 1240 may include a new DL MAC sub-header that is encapsulated in the same manner as shown in FIG. 13. However, in these exemplary embodiments, the new DL MAC sub-header may be formatted in a different manner to indicate the data payload is routed back UL data.

Figure 14B:
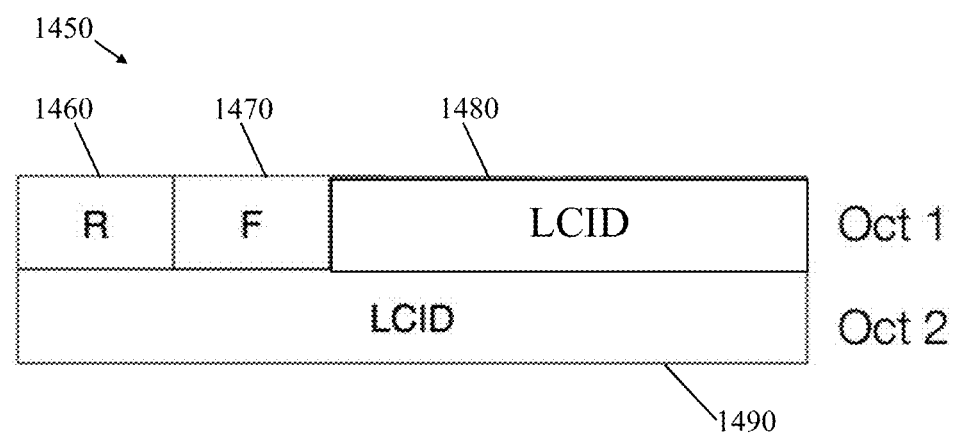
FIG. 14B shows a second exemplary new DL MAC sub-header that indicates the data payload is routed back UL data according to various exemplary embodiments.

FIG. 14B shows a second exemplary new DL MAC sub-header 1450 that indicates the data payload is routed back UL data according to various exemplary embodiments. The new DL MAC sub-header 1450 includes a Reserved (R) field 1460, a Format (F) field 1470 and a LCID field 1480 in a first octet and an LCID field 1490 in a second octet. In this exemplary embodiment, the LCID field 1480 may include a pre-defined logical channel to function similar to a tunnel to route back the UL data.

Again returning to the signaling diagram 1200 of FIG. 12, the route back transmission 1240 may be encapsulated as shown in the exemplary data encapsulation 1300 of FIG. 13 to include the new DL MAC sub-header (e.g., the new DL MAC sub-header 1450) that includes the indication of whether the data payload is routed back UL data (e.g., the identification of the pre-defined logical channel in the LCID field 1480). When the remote UE 112 receives and decodes the route back transmission 1240, the remote UE 112 will understand that the data payload is routed back UL data based on the pre-defined logical channel in the new DL MAC sub-header 1450. In these exemplary embodiments, the QoS handling may be based on a pre-defined SL DRB being used to carry the routed back data. The remote UE 112 may then send a UL data transmission 1245 to the gNB 120A, via the Uu connection, that includes the data packet(s) that were returned to the remote UE 112 by the relay UE 110.

EXAMPLES

In a first example, a device, comprises one or more processors configured to perform operations comprising transmitting, to a relay user equipment (UE) via a first connection, a data packet to be relayed to a recipient device, receiving, from the relay UE, a transmission including the data packet and an indication that the data packet is being returned and transmitting, to the recipient device via a second connection, the data packet.

In a second example, the device of the first example wherein the operations further comprise receiving, from the relay device, an acknowledgement (ACK) that the relay device received the data packet.

In a third example, the device of the second example wherein the operations further comprise, after receiving the ACK, removing the data packet from a transmission buffer.

In a fourth example, the device of the first example wherein the operations further comprise deciphering the data packet from the transmission and prior to transmitting the data packet to the recipient device, re-ciphering the data packet.

In a fifth example, the device of the first example, wherein the device is a base station and the recipient device is a remote UE and wherein the indication is included in an uplink (UL) Medium Access Control (MAC) header.

In a sixth example, the device of the fifth example, wherein the UL MAC header comprises a type field and the indication is included in the type field.

In a seventh example, the device of the sixth example, wherein the transmission is received on one of a default data radio bearer (DRB) or a reflective DRB corresponding to a DRB used to transmit the data packet to the relay UE.

In an eighth example, the device of the seventh example, wherein the UL MAC header comprises a Logical Channel Identification (LCID) field and the indication comprises an identification of a pre-defined logical channel in in the LCID field.

In a ninth example, the device of the eighth example, wherein the transmission is received on a data radio bearer (DRB) corresponding to the pre-defined logical channel.

In a tenth example, the device of the first example, wherein the device is a base station and the recipient device is a remote UE and wherein the indication is included in an uplink (UL) adaptation header.

In an eleventh example, the device of the first example, wherein the transmission comprises an original Radio Link Control (RLC) Protocol Data Unit (PDU) transmitted by the device that included the data packet.

In a twelfth example, the device of the first example, wherein the device is a remote UE and the recipient device is a base station and wherein the indication is included in an downlink (DL) Medium Access Control (MAC) header.

In a thirteenth example, the device of the twelfth example, wherein the DL MAC header comprises a type field and the indication is included in the type field.

In a fourteenth example, the device of the thirteenth example, wherein the transmission is received on a default sidelink (SL) data radio bearer (DRB).

In a fifteenth example, the device of the twelfth example, wherein the DL MAC header comprises a Logical Channel Identification (LCID) field and the indication comprises an identification of a pre-defined logical channel in in the LCID field.

In a sixteenth example, the device of the fifteenth example, wherein the transmission is received on a sidelink (SL) data radio bearer (DRB) corresponding to the pre-defined logical channel.

In a seventeenth example, a baseband processor of a base station is configured to perform operations comprising transmitting, to a relay user equipment (UE) via a first connection, a data packet to be relayed to a remote UE, receiving, from the relay UE, a transmission including the data packet and an indication that the data packet is being returned and transmitting, to the remote UE via a second connection, the data packet.

In an eighteenth example, the baseband processor of the seventeenth example, wherein the indication is included in an uplink (UL) Medium Access Control (MAC) header.

In a nineteenth example, the baseband processor of the eighteenth example, wherein the UL MAC header comprises a type field and the indication is included in the type field.

In a twentieth example, the baseband processor of the nineteenth example, wherein the transmission is received on one of a default data radio bearer (DRB) or a reflective DRB corresponding to a DRB used to transmit the data packet to the relay UE.

In a twenty-first example, the baseband processor of the eighteenth example, wherein the UL MAC header comprises a Logical Channel Identification (LCID) field and the indication comprises an identification of a pre-defined logical channel in in the LCID field.

In a twenty-second example, the baseband processor of the twenty-first example, wherein the transmission is received on a data radio bearer (DRB) corresponding to the pre-defined logical channel.

In a twenty-third example, the baseband processor of the seventeenth example, wherein the indication is included in an uplink (UL) adaptation header.

In a twenty-fourth example, a baseband processor of a remote UE is configured to perform operations, comprising transmitting, to a relay user equipment (UE) via a first connection, a data packet to be relayed to a base station, receiving, from the relay UE, a transmission including the data packet and an indication that the data packet is being returned and transmitting, to the base station via a second connection, the data packet.

In a twenty-fifth example, the baseband processor of the twenty-fourth example, wherein the indication is included in an downlink (DL) Medium Access Control (MAC) header.

In a twenty-sixth example, the baseband processor of the twenty-fifth example, wherein the DL MAC header comprises a type field and the indication is included in the type field.

In a twenty-seventh example, the baseband processor of the twenty-sixth example, wherein the transmission is received on a default sidelink (SL) data radio bearer (DRB).

In a twenty-eighth example, the baseband processor of the twenty-fifth example, wherein the DL MAC header comprises a Logical Channel Identification (LCID) field and the indication comprises an identification of a pre-defined logical channel in in the LCID field.

In a twenty-ninth example, the baseband processor of the twenty-eighth example, wherein the transmission is received on a sidelink (SL) data radio bearer (DRB) corresponding to the pre-defined logical channel.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE) configured to operate as a relay UE between a remote UE and a base station, comprising:
one or more processors configured to perform operations, comprising:
receiving, from an originating device, a data packet for relay to a recipient device;
determining that the relay of the data packet to the recipient device has failed, wherein the determining comprises detecting that a relay link has been terminated;
when it is determined the relay link has been terminated, starting a timer;
sending, to the originating device, a transmission including the data packet, wherein the transmission comprises an indication that the data packet is being returned to the originating device; and
performing the sending operations until the timer expires; and
a transceiver communicatively connected to the one or more processors.

2. The UE of claim 1, wherein the originating device is the base station and wherein the indication is included in an uplink (UL) Medium Access Control (MAC) header.

3. The UE of claim 2, wherein the UL MAC header comprises a type field and the indication is included in the type field.

4. The UE of claim 3, wherein the transmission is sent to the base station using one of a default data radio bearer (DRB) or a reflective DRB corresponding to a DRB used to receive the data packet.

5. The UE of claim 2, wherein the UL MAC header comprises a Logical Channel Identification (LCID) field and the indication comprises an identification of a pre-defined logical channel in in the LCID field.

6. The UE of claim 5, wherein the transmission is sent to the base station using a data radio bearer (DRB) corresponding to the pre-defined logical channel.

7. The UE of claim 1, wherein the originating device is the base station and wherein the indication is included in an uplink (UL) adaptation header.

8. The UE of claim 1, wherein determining the relay of the data packet has failed is based on, at least, not receiving an acknowledgement (ACK) from the recipient device.

9. The UE of claim 1, wherein the transmission comprises an original Radio Link Control (RLC) Protocol Data Unit (PDU) received from the originating device that included the data packet.

10. The UE of claim 1, wherein the originating device is the remote UE and wherein the indication is included in an downlink (DL) Medium Access Control (MAC) header.

11. The UE of claim 10, wherein the DL MAC header comprises a type field and the indication is included in the type field.

12. The UE of claim 11, wherein the transmission is sent to the remote UE using a default sidelink (SL) data radio bearer (DRB).

13. The UE of claim 10, wherein the DL MAC header comprises a Logical Channel Identification (LCID) field and the indication comprises an identification of a pre-defined logical channel in in the LCID field.

14. The UE of claim 13, wherein the transmission is sent to the remote UE using a sidelink (SL) data radio bearer (DRB) corresponding to the pre-defined logical channel.

15. A baseband processor configured to perform operations comprising:
receiving, from an originating device, a data packet for relay to a recipient device;
determining that the relay of the data packet to the recipient device has failed, wherein the determining comprises detecting that a relay link has been terminated;
when it is determined the relay link has been terminated, starting a timer;
sending, to the originating device, a transmission including the data packet,
wherein the transmission comprises an indication that the data packet is being returned to the originating device,
wherein the transmission comprises an original Radio Link Control (RLC) Protocol Data Unit (PDU) received from the originating device that included the data packet; and
performing the sending operations until the timer expires.

16. The baseband processor of claim 15, wherein the originating device is a base station and wherein the indication is included in an uplink (UL) Medium Access Control (MAC) header.

17. The baseband processor of claim 16, wherein the UL MAC header comprises a type field and the indication is included in the type field.

18. The baseband processor of claim 17, wherein the transmission is sent to the base station using one of a default data radio bearer (DRB) or a reflective DRB corresponding to a DRB used to receive the data packet.

19. A method performed by a user equipment (UE) configured to operate as a relay UE between a remote UE and a base station, comprising:
receiving, from an originating device, a data packet for relay to a recipient device;
determining that the relay of the data packet to the recipient device has failed, wherein the determining comprises detecting that a relay link has been terminated;
when it is determined the relay link has been terminated, starting a timer;
sending, to the originating device, a transmission including the data packet,
wherein the transmission comprises an indication that the data packet is being returned to the originating device,
wherein the transmission comprises an original Radio Link Control (RLC) Protocol Data Unit (PDU) received from the originating device that included the data packet; and
performing the sending operations until the timer expires.

* * * * *